United States Patent
Driehorn et al.

(10) Patent No.: US 7,309,993 B2
(45) Date of Patent: Dec. 18, 2007

(54) THREE- OR FOUR-POLE LOW-VOLTAGE POWER SWITCH WITH ROGOWSKI COILS OPERATING AS CURRENT SENSORS

(75) Inventors: Thomas Driehorn, Berlin (DE); Andreas Krauss, Berlin (DE); Andreas Pancke, Berlin (DE); Ilka Redmann, Falkensee (DE); Wolfgang Röhl, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/591,461

(22) PCT Filed: Mar. 2, 2005

(86) PCT No.: PCT/DE2005/000383

§ 371 (c)(1),
(2), (4) Date: Sep. 1, 2006

(87) PCT Pub. No.: WO2005/086308

PCT Pub. Date: Sep. 15, 2005

(65) Prior Publication Data

US 2007/0182401 A1 Aug. 9, 2007

(30) Foreign Application Priority Data

Mar. 4, 2004 (DE) .................... 10 2004 011 023

(51) Int. Cl.
*G01R 31/14* (2006.01)

(52) U.S. Cl. ...................................... 324/509; 361/42

(58) Field of Classification Search ............... 324/509, 324/515; 361/31, 42, 62

See application file for complete search history.

(56) References Cited

U.S. PATENT DOCUMENTS

| | | | | |
|---|---|---|---|---|
| 4,933,630 A | * | 6/1990 | Dupraz | 324/107 |
| 7,180,717 B2 | * | 2/2007 | Kojovic et al. | 361/62 |

FOREIGN PATENT DOCUMENTS

| | | |
|---|---|---|
| DE | 26 56 817 | 6/1978 |
| DE | 31 15 522 A1 | 11/1982 |
| DE | 24 27 525 C2 | 12/1984 |
| DE | 36 42 136 C3 | 11/1989 |
| DE | 39 41 882 A1 | 6/1991 |
| DE | 41 11 831 A1 | 10/1992 |
| DE | 42 04 515 A1 | 8/1993 |
| DE | 198 28 890 A1 | 2/2000 |
| DE | 198 54 436 A1 | 6/2000 |
| DE | 100 54 496 A1 | 5/2002 |
| EP | 0 939 472 A | 9/1999 |

OTHER PUBLICATIONS

Drachsel, R.: "Grundlagen der elektrischen Meβtechnik", VEB-Verlag Technik, Berlin, 1983, 7. Auflage, Seite 150-153.

* cited by examiner

*Primary Examiner*—Walter Benson
(74) *Attorney, Agent, or Firm*—Harness, Dickey & Pierce, P.L.C.

(57) ABSTRACT

A three or four pole low-voltage power switch is disclosed wherein the switch is partly provided with a device for detecting ground faults. For this purpose, the current vectorial sum must be produced in the three or four conductors of a monitored network. For the switches of this type, output signals received from Rogowski coils are directed via resistances to an integration capacitor whose voltage forms an input signal of another measuring amplifier representing the current sum of a monitored network. The output signal of the measuring amplifier is, afterwards processed in a known manner in the microprocessor of an excess-current trip.

2 Claims, 1 Drawing Sheet

THREE- OR FOUR-POLE LOW-VOLTAGE POWER SWITCH WITH ROGOWSKI COILS OPERATING AS CURRENT SENSORS

This application is the national phase under 35 U.S.C. § 371 of PCT International Application No. PCT/EP2005/000383 which has an International filing date of Mar. 2, 2005, which designated the United States of America and which claims priority on German Patent Application number 10 2004 011 023.9 filed Mar. 4, 2004, the entire contents of which are hereby incorporated herein by reference.

FIELD

The invention generally relates to a three-pole or four-pole low-voltage power switch using Rogowski coils as current sensors, an electronic overcurrent release and/or a device for ground-fault detection. The outputs of the Rogowski coils may each be taken via an RC low-pass filter to an instrumentation amplifier of the overcurrent release.

BACKGROUND

Three-pole or four-pole low-voltage power switches are sometimes fitted with a device for ground-fault detection. To detect a ground fault, it is necessary to form the vectorial sum of the currents in the three/four conductors of the monitored electrical power network. It is also possible to connect an external summation current transformer, which summates the primary currents directly. Depending on the requirements of the switching installation in which the power switch is used, a detected ground fault is either merely signaled or causes the switch to trip after a preset delay.

If the power switch works using Rogowski coils as current sensors, as disclosed in German patent DE 100 54 496 A1 for example, the currents in the Rogowski coils are far too small for a summation evaluation according to the type of detection in the neutral conductor described in the introduction. In order to still be able to detect ground faults, the practice until now was to generate by calculation the summation current from the individual current signals, after their analog-to-digital conversion in the microprocessor, and to provide it as a digital value.

The sampling in the processor results in errors, because the processor detects the individual analog-to-digital converter values with a time offset from one phase to the next. Thus, the signal is measured with a time difference of 90 µs from phase L1 to phase N. Although the summation current can be calculated by interpolation and backward projection to the first of three/four sample values in each case, a significant systematic error still remains, in particular when there are dynamic current variations in the power network.

SUMMARY

An object of at least one embodiment of the invention is to enable ground-fault detection in a simpler manner for a low-voltage power switch using Rogowski coils as current sensors.

According to at least one embodiment, the output signals of all the Rogowski coils are taken via resistors in common to an integration capacitor, whose voltage forms the input signal of an additional instrumentation amplifier indicating the summation current in the monitored power network. The output signal of this instrumentation amplifier is then processed further in the microprocessor of the overcurrent release in a manner known in the art.

BRIEF DESCRIPTION OF THE DRAWINGS

The invention shall be described in more detail below with reference to an example embodiment.

The associated drawing shows in a block diagram the current detection system for an electronic overcurrent release of a low-voltage power switch.

DETAILED DESCRIPTION OF THE EXAMPLE EMBODIMENTS

Figure 1:
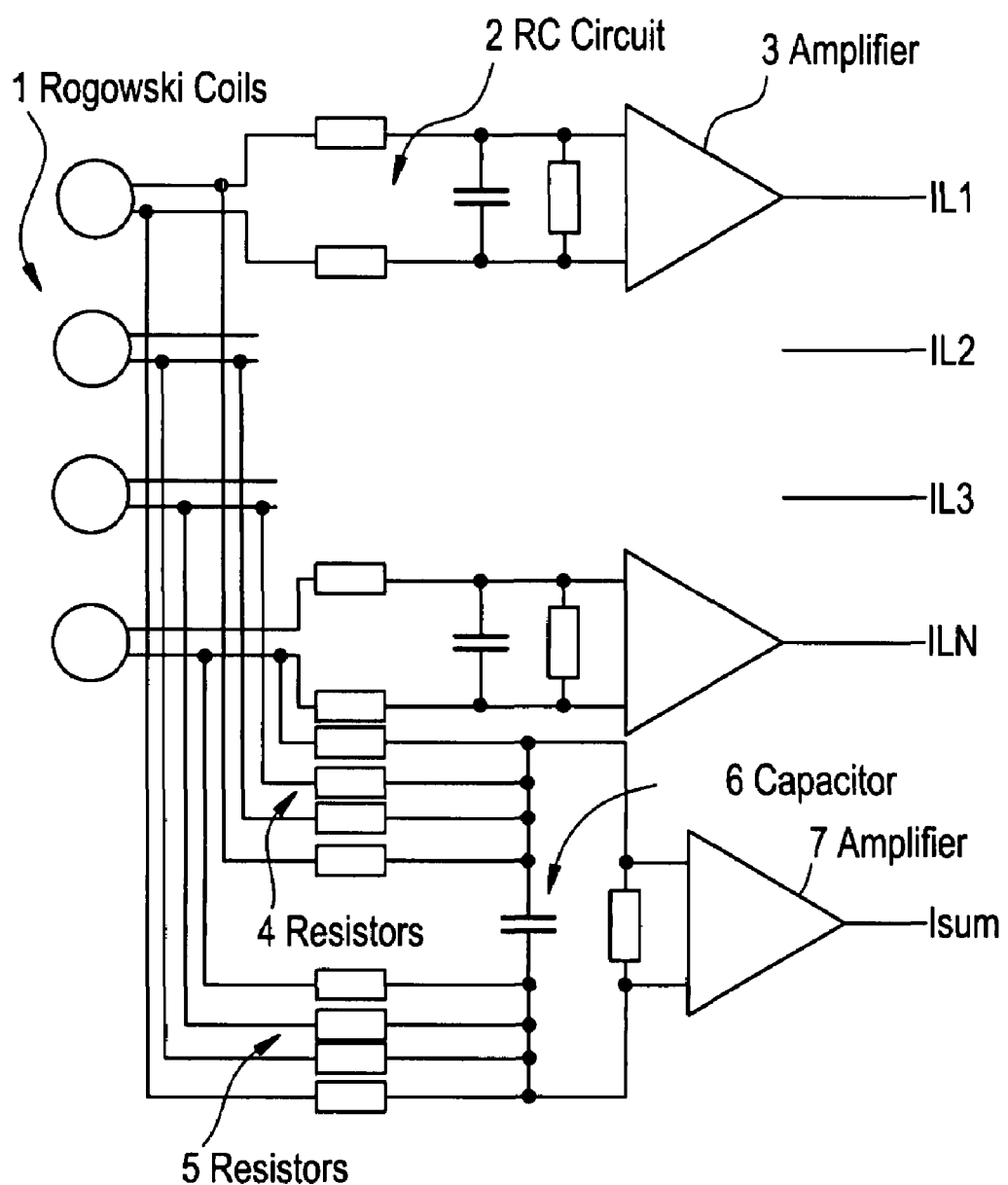

Rogowski coils 1 are used as sensors for detecting the currents in the power network. The outputs of the Rogowski coils 1 are taken via a symmetric low-pass RC circuit 2 to the inputs of instrumentation amplifiers 3. At their outputs lie the signals IL1, IL2, IL3, ILN proportional to the power-network currents for the three phase conductors and the neutral conductor of the power network, which are then taken via AD-converters (not shown here) to a microprocessor, which monitors the signals IL1, IL2, IL3, ILN for inadmissibly high values, and, if applicable, causes the power switch to trip immediately or after a delay.

In addition to detecting the individual currents, summation is now also provided on the analog side of the overcurrent release. For this purpose, the output signals of the Rogowski coils 1 are each taken via a symmetrical low-pass filter comprising the resistors 4 and 5 and a common integration capacitor 6 to an additional instrumentation amplifier 7, at whose output lies a signal $I_{Sum}$, which represents the sum of all the currents in the monitored power network. If the summation current (minus a preset tolerance value) does not equal zero, then there is a ground fault in the area located after the power switch. The ground fault is signaled by a visual indicator, and, if applicable, also causes the overcurrent release to trip after a preset delay and hence to disconnect the connected loads.

Using the arrangement it is possible to select the measurement range of the current summation in terms of the gain so that the analog-to-digital converter is driven over its maximum range. The sampling error that previously occurred no longer exists.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. At least one of a three-pole and four-pole low-voltage power switch, comprising:
    an electronic overcurrent release;
    a device for ground-fault detection; and
    Rogowski coils usable as current sensors for a power network, outputs of the Rogowski coils each being taken via an RC low-pass filter to an instrumentation amplifier of the electronic overcurrent release, and
    output signals of all the Rogowski coils being taken via resistors in common to an integration capacitor, whose voltage forms an input signal of an additional instrumentation amplifier indicating summation current in the power network.

2. The switch of claim 1, wherein an output signal of the additional instrumentation amplifier is processed further in a microprocessor of the electronic overcurrent release.

* * * * *